United States Patent [19]

Edakubo

[11] Patent Number: 4,679,099
[45] Date of Patent: Jul. 7, 1987

[54] INFORMATION SIGNAL REPRODUCING APPARATUS

[75] Inventor: Hiroo Edakubo, Tokyo, Japan

[73] Assignee: Canon Kabushiki Kaisha, Tokyo, Japan

[21] Appl. No.: 633,799

[22] Filed: Jul. 24, 1984

[30] Foreign Application Priority Data

Jul. 28, 1983 [JP] Japan .................................. 58-138549

[51] Int. Cl.$^4$ ................................................ G11B 5/56
[52] U.S. Cl. ...................................... 360/10.2; 360/77
[58] Field of Search ........................ 360/10.2, 10.3, 70, 360/77

[56] References Cited

U.S. PATENT DOCUMENTS 4,439,799 3/1984 Haubrich et al. ...................... 360/77
4,509,083 4/1985 Nakano .................................. 360/77

Primary Examiner—George G. Stellar
Attorney, Agent, or Firm—Toren, McGeady & Associates

[57] ABSTRACT

The disclosed information signal reproducing apparatus reproduces information signals from a recording medium with a number or tracks. Four pilots signals having different frequencies from one another are recorded successively on the tracks along with information signals. A reproducing element only traces alternate ones of the recording tracks. A generator produces a signal having a prescribed frequency. A signal processing circuit forms a tracking control signal for a reproducing element from the prescribed frequency signal obtained from the generator and the pilot signals reproducing by the reproducing element, and a control circuit controls the tracking of the reproducing element based on the tracking control signal.

18 Claims, 15 Drawing Figures

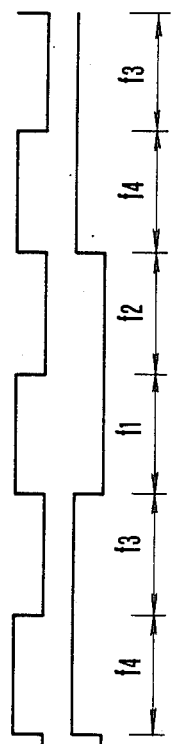
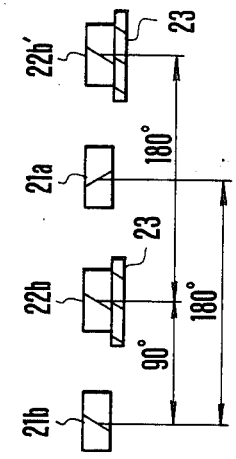
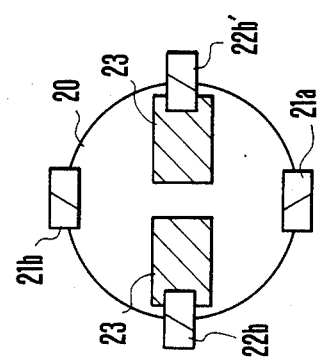
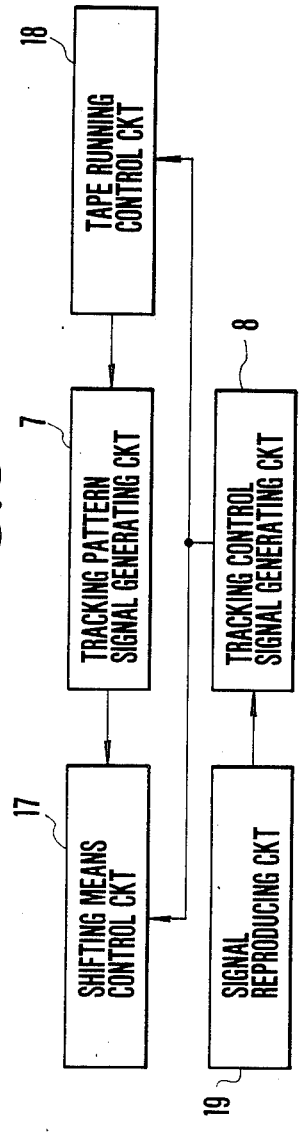
FIG.3(A)
FIG.3(B)
FIG.4(A)
FIG.4(B)
FIG.5

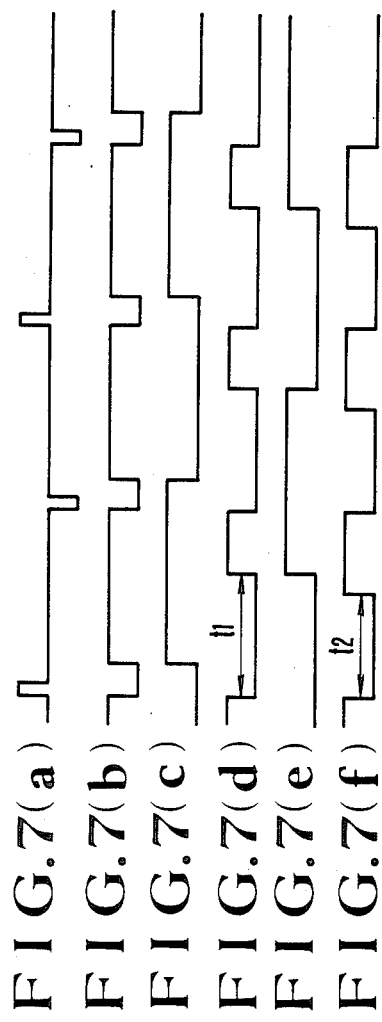
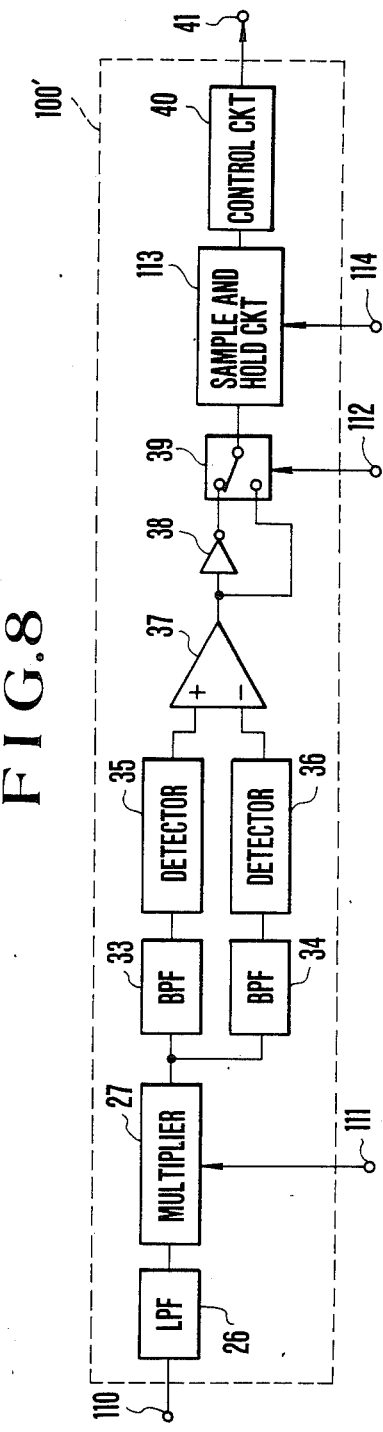

INFORMATION SIGNAL REPRODUCING APPARATUS

BACKGROUND OF THE INVENTION

1. Field of the Invention

This invention relates to information signal reproducing apparatus and more particularly to such type of apparatus which reproduces information signal from a recording medium having formed thereon a number of tracks in which four pilot signals having different frequencies from one another are recorded successively one at each track along with information signals.

2. Description of the Prior Art

A magnetic tape may have successive cross tracks formed in sequence by rotating two heads during recording of video signals, and a magnetic video reproducing apparatus (hereinafter called "VTR") may reproduce the video signals from such tracks. The following may, for example, involve such tape.

Two tracking control methods have been employed for precisely tracking VTR recording tracks during reproduction.

In the first method, control signals which have been recorded in synchronism with video signals are used for obtaining a tracking control signal during reproduction. The second method involves superimposing a prescribed pilot signal on the video signals during recording. For reproduction, this pilot signal is processed to obtain a tracking control signal.

The present invention can be applied to great advantage in VTRs employing the aforesaid second tracking control method and, particularly, in VTRs in which four pilot signals of different frequency are successively superimposed on video signals, with one of the four pilot signals on each track.

The basic concept of this type of VTR is explained with reference to FIG. 1. Four pilot signals (f1, f2, f3, f4) are recorded on respective tracks, in the order of f1, f2, f4 and f3, in superimposed relation on video signals. For reproduction, a signal having the same frequency as the pilot signal superimposingly recorded on those tracks to be principally treated, is multiplied to obtain crosstalk components from the front and rear adjacent tracks. Tracking is controlled by comparing their levels with each other.

The use of this method makes it possible to obtain a tracking signal throughout the entire length of the video track. With a video head attached on a bimorph or other suitable electric-mechanic converting element, precise tracking is assured and clear images free from noise can be reproduced at a desired speed, even when the tape is transported at a different speed during reproduction from the speed during recording (variable-speed reproduction). For variable-speed reproduction, however, the reproduced pilot signal must be multiplied by a signal of the same frequency as that of the pilot signal superimposed on the video signal in the principal track solely to be traced by the video head.

In FIG. 1, a reproducing mode which operates at, for example, three-times the speed of recording is illustrated. Tracks Am and Bm (m=integer) are recorded on the magnetic tape by the rotating two-head helical scan type VTR for heads A and B having magnetizing directions different from each other. In FIG. 1, V indicates an area from which the video signals are reproduced between overlapping areas O1 and O2 and f1, f2, f3 and f4 on the respective track lines represent the frequencies of the pilot signals superimposed on the video signals in the corresponding tracks.

The head A first traces a track A1. Subsequently, the head B traces another track B2. The head A then transfers to a track A4, the head B to a track B5, and so on. In such track-tracing, the pilot signals reproduced in sequence are f1→f3→f4→f2 (→f1 . . . ) for each field, which is different from that in the normal reproduction mode, or the normal pilot signal rotation (f1→f2→f4→f3). This rotation changes at various tape speeds multiplied by integers during reproduction as summarized in Table 1 below.

TABLE 1

| Speed Factor (n: Integer) | Pilot Signal Rotation |
|---|---|
| 4n | f1 → f2 or f2 → f4 or f4 → f3 or f3 → f1 |
| 4n + 1 | f1 → f2 → f4 → f3 |
| 4n + 2 | f1 → f2 or f2 → f4 or f4 → f3 or f3 → f1 |
| 4n + 3 | f1 → f3 → f4 → f2 |

The varying speed reproduction modes are not limited to the cases where the tape running speed is multiplied by integer values, but may include slow motion reproduction and other cases where the factor by which the tape running speed is decreased or increased does not have an integer value. In such cases, the rotation of the pilot signals reproduced becomes further complicated.

FIG. 2 illustrates a circuit for rotation of the pilot signals during recording. Table 2 is a function table for the data selector 6 of FIG. 2. FIGS. 3(A) and 3(B) are pulse timing charts of wave-forms in the lines A and B of FIG. 2, respectively. In FIG. 2, as a cylinder 1 rotates, a phase detector head 2 picks up a signal (cylinder PG). The output of head 2 is delayed by a mono-stable multivibrator 3 and is formed by a flip-flop (FF) 4 into a head selection pulse (so called 30 PG), which is applied as a select input A to a data selector 6. Another FF 5 acts as a frequency divider which receives the 30 PG to produce an output which is applied as another select input B to the data selector 6. The data selector 6 operates as shown in Table 2. If both the input A and the input B are high, the signal f4 from an input line 14 is placed onto an output line 15; if the input A is low while the input B is high, the signal f3; if the input A is high while the input B is low, the signal f1; and if both inputs A and B are low, the signal f2, is selectively placed onto the output line 15. Therefore, the pilot signals appear in the order of f1→f2→f4→f3, as indicated in FIGS. 3(A) and 3(B).

TABLE 2

| | | Operation of the data selector | | | |
|---|---|---|---|---|---|
| Control Input | | Data Input | | | Output |
| A | B | f1 | f4 | f2 | f3 | Y |
| H | L | H | — | — | — | H |
| H | H | — | H | — | — | H |
| L | L | — | — | H | — | H |
| L | H | — | — | — | H | H |

Such a pilot signal forming circuit has found general use in obtaining multiplier signals by which the reproduced pilot signals are multiplied at the time of reproduction. During operation in a normal reproduction mode, this circuit can be used for recording and reproduction. However, when varying speed reproduction is preformed, the rotation of the multiplier signals must be altered, depending on the value of the tape running speed. To allow the tape speed to increase, for example, by a factor of any integer, the pilot signal forming circuit must be constructed to produce the pilot signals in one of the rotations shown in Table 1 by taking into account the value of the tape speed. This requirement cannot be fulfilled without involving a great increase in the complexity of structure of the signal forming circuit. Also, it has been impossible to carry out the operation of changing the aforesaid speed magnification in analog form.

SUMMARY OF THE INVENTION

With the above-described drawbacks in mind, the present invention has been made and its principal object is to provide an information signal reproducing apparatus which enables, despite the running speed of a medium in reproduction, a good tracking control, while still preserving an extremely simple construction.

Another object of the invention is to provide a reproducing apparatus of such construction as to trace only the alternate ones of the recorded tracks on a medium, wherein the scale of circuitry is made extremely small to obtain a good tracking control signal.

Still another object of the invention is to provide a reproducing apparatus capable of displacing a rotating reproduction head along the axis of rotation thereof by a shifting element, wherein the scale of circuitry is made extremely small to obtain a good tracking control signal.

For these objects, according to the present invention, in a specific embodiment thereof, the information signal reproducing apparatus is adapted to use a recording medium having formed thereon a number of tracks in which four pilot signals having different frequencies from one another are successively recorded one at each track along with information signals, from which medium are reproduced the information signals. The apparatus includes reproducing elements for tracing only the alternate tracks out of the aforesaid number of recorded tracks; a generator for producing one signal of a prescribed frequency; a signal processing circuit using the aforesaid prescribed frequency signal from the generator and the pilot signals reproduced by the reproducing elements for forming a tracking control signal for the reproducing elements; and a tracking control circuit for controlling the tracking of the reproducing elements based on the aforesaid tracking control signal.

Other objects and features of the invention will become apparent from the following detailed description of embodiments thereof taken in conjunction with the accompanying drawings.

BRIEF DESCRIPTION OF THE DRAWINGS

FIGS. 3(A) and 3(B) are, respectively, timing charts illustrating the wave-forms at the control inputs of the data selector of FIG. 2.

FIGS. 4(A) and 4(B) are, respectively, schematic views illustrating the construction and arrangement of the head elements of the VTR according to the invention.

FIG. 5 is a block diagram schematically showing the circuitry of the VTR according to the invention.

FIGS. 7(a) to 7(f) are, respectively, timing charts illustrating the wave-forms at the various portions of the circuit of FIG. 6.

FIG. 8 is a circuit diagram of the main parts of another embodiment of the VTR according to the present invention.

DETAILED DESCRIPTION OF THE PREFERRED EMBODIMENTS

Figure 1:
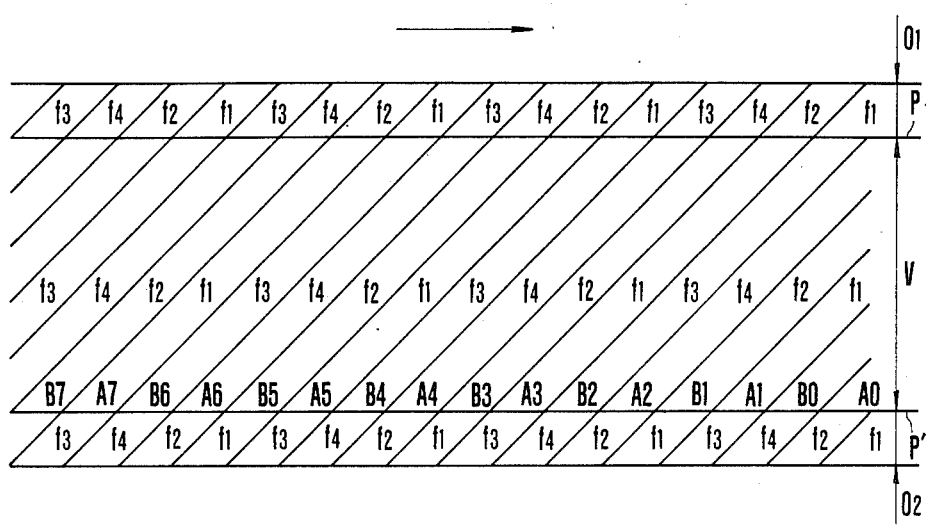
FIG. 1 is a diagram considered to explain the tracking method for a VTR which permits the use of a recording medium having pilot signals recorded in superimposing relation.

The present invention will next be described in great detail in connection with embodiments thereof applied to the VTR. FIGS. 4(A) and 4(B) illustrate the construction and arrangement of the head elements of the rotating head cylinder of an embodiment of the VTR according to the invention. Elements 21a and 21b designate video heads for use in the recording and the normal reproduction modes, having different magnetizing directions from each other. The other video heads 22b and 22b' are adapted to be used solely for varying speed reproduction modes, and have the same magnetizing direction (azimuth). The latter reproducing video heads 22b and 22b' are carried on bimorph elements and arranged to be displaceable along an axis of rotation of the cylinder 20.

In FIG. 5 there is shown another embodiment of the VTR including a signal reproducing circuit 19 including the reproducing heads of FIG. 4 and reproduction amplifiers. Using the pilot signals reproduced by the circuit 19, another circuit 8 forms a tracking control signal. Also using the tracking control signal, the tape running is controlled by a tape running control circuit 18.

As the signal corresponding to the tape running speed to be used in the tape running control circuit 18, a signal synchronized with the rotation of a capstan, for example, is supplied to a tracking pattern signal generating circuit 7. In the pattern signal generating circuit 7, a tracking pattern signal corresponding to the change of the deviation of the center of the tracing path of the reproducing head from the central path of the recorded track resulting from the change of the tape running speed is formed in a way known in the art. A shifting element control circuit 17 controls a shifting element, such as a bimorph element, on the basis of this tracking pattern signal and the aforesaid tracking control signal so that the reproducing head traces the recorded track accurately.

In the following, particularly the tracking control signal generating circuit 8 will be explained in detail. The use of heads of the same azimuth in reproduction has been widely accepted as a method of making possible the field still in many VTRs. But, in this embodiment of the invention, the use of such head arrangement is intended to obtain another distinctive effect. In the following, the technical thought of this embodiment will be explained. With the heads of different azimuths, the necessary number of multiplier pilot signals is four for the tracks having superimposed thereon four pilot signals f1 to f4. Different from this, when reproducing is performed by using heads of the same azimuth, it is sufficient to consider tracks which bear only two of the pilot signals, f1 and f4, or f2 and f3.

Figure 2:
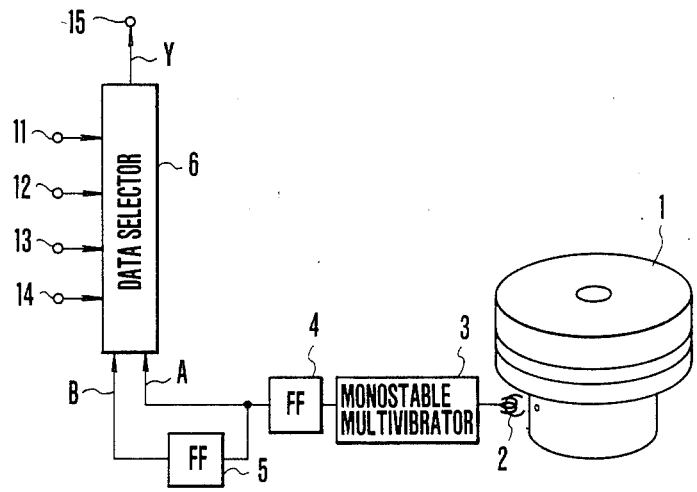
FIG. 2 is a diagram of a circuit for rotation of the pilot signals for recording.
Figure 6:
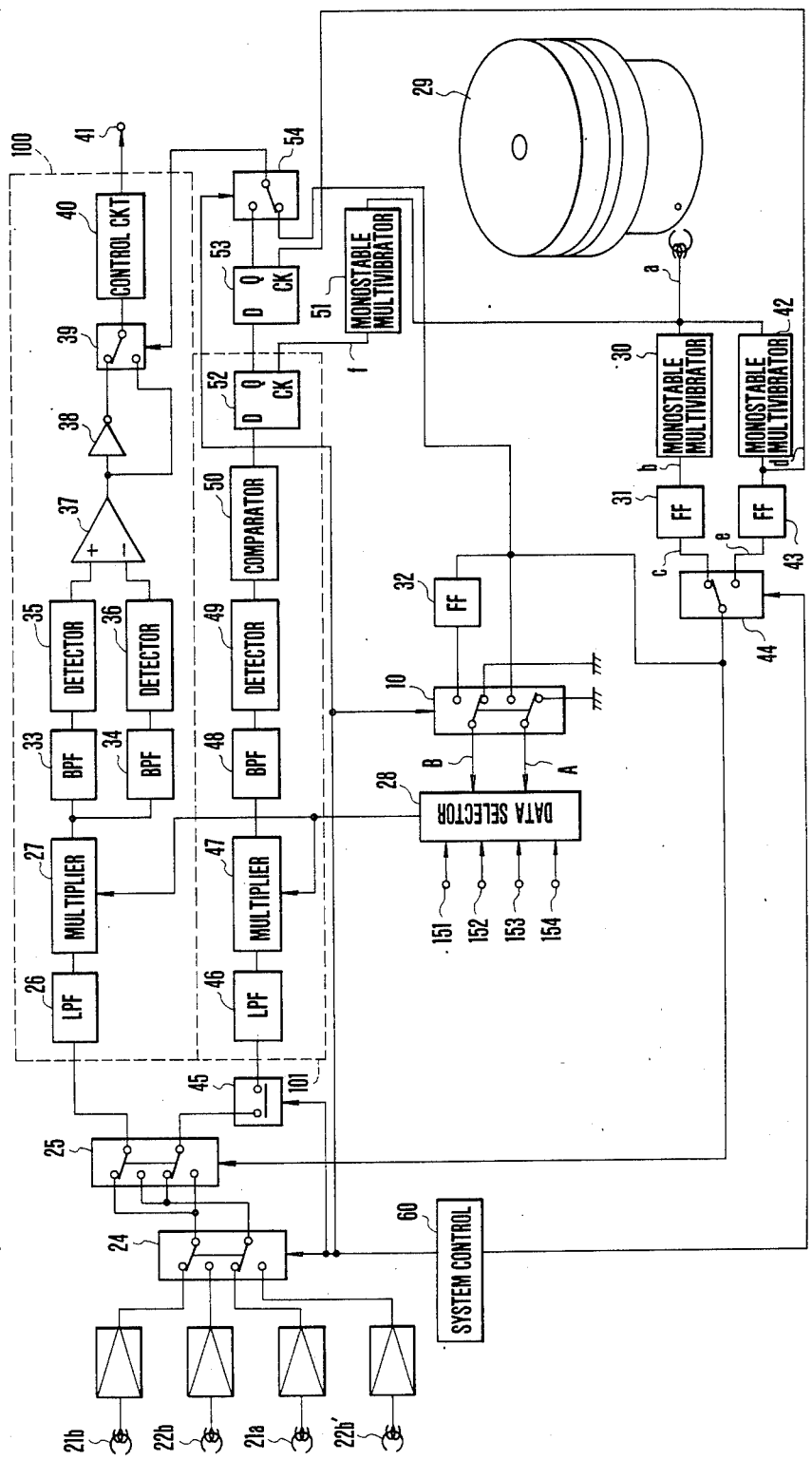
FIG. 6 is a circuit diagram of the main parts of the VTR according to the invention.

The following description will be limited to the tracking control system, although a video signal system is provided separately. FIG. 6 is a block diagram illustrating the circuitry of the tracking control system of one embodiment of the VTR according to the present invention. FIGS. 7(a) to 7(f) are pulse timing charts of the wave-forms at the various portions "a" to "f" of FIG. 6. It is assumed that the four frequencies in KHz are f1=102, f2=119, f3=148 and f4=165, and that when recording, is performed, a tape pattern such as that shown in FIG. 1 is recorded according to the circuit shown in FIG. 2. Elements P and P' in FIG. 1 indicate points at which the heads are changed over by the signal (hereinafter called 30 PG).

At first, the operation of the normal reproduction mode will be described. Depending on the mode indicated by a mode switch (not shown), a system control 60 sets a head selection switch 24 for the heads 21a, 21b, 22b and 22b'. Responsive to 30 PG, a head changing over switch 25 connects the heads 21a and 21b to the tracking control system 100. The reproduced pilot signals, after having been separated from the video signals by an LPF 26, enter a multiplier 27. Multiplier frequencies in the multiplier 27 are obtained from a data selector 28 to which are applied the 30 PG from an FF 31 having an input connected to the output of a mono-stable multivibrator 30 which receives the PG output of the cylinder 29 and the output signal of another FF 32 having an input connected to the output of the first FF 31 through a switch 10. That is, the data selector 28 is similar in construction to that shown at 6 in FIG. 2, and is assumed to produce outputs depending on the input data A and B as shown in Table 2. Elements 151 to 154 are input terminals at which the f1 to f4 appear. That is, in the normal reproduction mode, the pilot signals f1, f2, f4 and f3 are produced in sequence from the data selector 28 in the same order at that in recording.

TABLE 3

| Recorded Signal KHz | | Reproduced Signal KHz | | Multiplier Signal KHz | | Output of Multiplier KHz | |
|---|---|---|---|---|---|---|---|
| f1 | 102 | (Front) | 148 | f1 | 102 | 250 | 46 |
| | | | | | | 204 | 0 |
| | | | | | | 221 | 17 |
| | | | 102 | — | — | — | — |
| | | (Rear) | 119 | f4 | 165 | 313 | 17 |
| | | | | | | 267 | 63 |
| | | | | | | 284 | 46 |
| f2 | 119 | (Front) | 102 | f2 | 119 | 221 | 17 |
| | | | | | | 238 | 0 |
| | | | | | | 284 | 46 |
| | | | 119 | — | — | — | — |
| | | (Rear) | 165 | f3 | 148 | 250 | 46 |
| | | | | | | 267 | 29 |
| | | | | | | 313 | 17 |
| f4 | 165 | (Front) | 119 | f4 | 165 | 284 | 46 |
| | | | | | | 330 | 0 |
| | | | | | | 313 | 17 |
| | | | 165 | — | — | — | — |
| | | (Rear) | 148 | f1 | 102 | 221 | 17 |
| | | | | | | 267 | 63 |
| | | | | | | 250 | 46 |
| f3 | 148 | (Front) | 165 | f2 | 148 | 313 | 17 |
| | | | | | | 296 | 0 |
| | | | | | | 250 | 46 |
| | | | 148 | — | — | — | — |
| | | (Rear) | 102 | f2 | 119 | 284 | 46 |
| | | | | | | 267 | 29 |
| | | | | | | 221 | 17 |

Table 3 is a table showing the outputs of the multiplier in each track. In the following, the description will be continued referring to Table 3. For example, in the case where the frequency of the pilot signal superimposed on a certain track being reproduced is 119 KHz (f2), the crosstalk component from the front adjacent track is 102 KHz, and the crosstalk component from the rear adjacent track is 165 KHz. When this signal is multiplied by a signal of 119 KHz, the output of the multiplier is a spectrum of (119+119=) 238 KHz, (102+119=) 221 KHz, (119−102=) 17 KHz, (165+119=) 284 KHz and (165−119=) 46 KHz. Moreover 17 KHz and 46 KHz arise because there are the crosstalk signals from the adjacent tracks, and their levels represent the crosstalk amounts. These are taken out by BPF 33 and BPF 34, then detected by detector circuits 35 and 36, and then applied to a difference amplifier 37. A capstan and a bimorph are thus controlled in a direction to minimize the difference between the levels to effect tracking.

However, as will be understood from Table 3, of the spectrum in the output of multiplier 27, the 17 KHz component and the 46 KHz component are taken alternatively by the crosstalks from the front and rear adjacent tracks each time the field transit occurs. For this reason, an inversion amplifier 38 is provided for driving the change-over switch 39 each time the field transit occurs in such a way that when the 30 PG is of low level, it is allowed to stand as it is, and when it is of high level, the switching is reversed. Thus, a right tracking signal is obtained. The thus-obtained tracking signal is supplied through a control circuit 40 from an output terminal 41 to a capstan control system.

Description will be made of operations of the special reproduction modes. Responsive to the signal from the system control 60, the mode switch 24 changes over, whereby heads 22b and 22b' are connected to the tracking control system and video signal reproducing system (not shown). The heads 22b and 22b' are assumed to have an azimuth angle corresponding to the tracks on which have been recorded the pilot signals f2 and f3. Now assuming that when the head 22b reproduces the track having the signal f2, the pilot signal reproduced by this head is processed in a similar manner to that in which the normal reproduction mode operates. Next let us consider the case where, when the pilot signal superimposed in the track being reproduced is f2, the reproduced signal is multiplied by f2. The front adjacent track to the f3 gives a crosstalk component of (f4=) 165 KHz, and the rear adjacent track to the f3 gives a crosstalk component of (f1=) 102 KHz. When the reproduced signal is multiplied by (f2=) 119 KHz, there is produced a spectrum of (165+119=) 284 KHz, (148+119=) 267 KHz, (102+119=) 221 KHz, (165−119=) 46 KHz, (148−119=) 29 KHz and (119−102=) 17 KHz. With respect to the components of 46 KHz and 17 KHz, it can be seen that these two frequency components are also produced due to the presence of the crosstalk, and can be used as the tracking signals. However, these two components have their positions exchanged when the reproduced signal from the same track is multiplied by the signal of f3 (see Table 3). Therefore, when the heads for tracking are of the same azimuth angle, only one frequency is always used as the multiplier signal. Then when the recorded frequency is different from the multiplier frequency, the aforesaid inversion amplifier 18 is operated to inverse the history relation, whereby it is possible to obtain a correct tracking signal. The so-produced tracking signal is applied through the terminal 41 to the bimorph fixedly carrying the heads 22b and 22b' or a capstan servo system.

Whether or not the recorded pilot signal and the multiplier pilot signal are the same can be discriminated at the overlapped portions shown in FIG. 1. In FIG. 6, one of the heads 22b and 22b' which is not in use for reproduction is connected to a discrimination circuit system 110 by a head change-over switch 25. The head change-over control signal is obtained by processing the PG output of the cylinder through the mono-stable multivibrator 42 and the FF 43. This signal is delayed by 90° in phase from the 30 PG for the normal reproduction mode (see FIGS. 7(a) to 7(f)). The phase of the 30 PG is changed over between the normal and special reproduction modes when a switch 44 is operated by the system control 60. A switch 45 is provided for connecting the output of the head to the discrimination circuit system 101 only when the special reproduction mode is selected to operate. By such arrangement, the output of the head enters the discrimination circuit system only when an overlapping occurs. From this output is separated the pilot signal by an LPF 46. Then, this signal is multiplied by the same pilot signal as that supplied to the tracking control system 100. As shown in FIG. 1, recorded in the front area of the head change-over point P is the one-ahead frequency.

Table 4 illustrates the spectra obtained by multiplying the reproduced signal from the overlapped area by the signal f2 when the heads 22b and 22b' start to reproduce near the tracks whose video areas contain f2 and f3 respectively. As is obvious from Table 4, when the reproduction starts near the track whose video area contains f3, it is characterized in that the 46 KHz component is obtained from the multiplication of the overlapped area by the signal f2.

TABLE 4

| Video Area Signal | Overlapped Area Signal KHz | | Multiplier Signal KHz | | Output of Multiplier KHz | |
|---|---|---|---|---|---|---|
| f2 | f3 | 148 | f2 | 119 | 267 | 29 |
|  | f1 | 102 |  |  | 221 | 17 |
|  | f2 | 119 |  |  | 238 | 0 |
| f3 | f2 | 119 | f2 | 119 | 238 | 0 |
|  | f4 | 165 |  |  | 284 | 46 |
|  | f3 | 148 |  |  | 267 | 29 |

Therefore, whether or not this 46 KHz component is detected in the overlapped area leads to the possibility of discriminating what pilot signal has been recorded in the video area. Therefore, a BPF 48 extracts the 46 KHz component from the output of the multiplier 47. The output of the BPF 48, after having been detected by a detector circuit 49, is compared with a prescribed level by taking into account the width of the head by a comparator 50. When the 46 KHz component is above a certain level, the comparator 50 produces an output signal of high level. In order to perform its sampling before the head is changed over, this signal is delayed by a mono-stable multivibrator 51 having a hold time shorter than t1 but longer than t2 shown in FIGS. 7(a) to 7(f) for the PG of the cylinder, then sampled as a clock of a D type FF 52 and then applied to a D type FF 53 at its D terminal which uses the output of the mono-stable multivibrator 42 as a clock. Thus, a track discriminating signal is produced in synchronism with the head change-over timing. By this signal, the aforesaid change-over switch 39 is operated to obtain a precise tracking signal.

To obtain the only one frequency, the inputs A and B of the data selector 28 have to be set at either a high or low level. In the case of f2, both of the inputs A and B may be dropped to a low level. This operation is carried out by the system control 60 controlling the operation of the switch 44.

FIG. 8 illustrates the construction of the main parts of another embodiment of the VTR according to the invention. Only a tracking control system 100' is shown. The same numerals have been employed to denote the similar parts to those shown in FIG. 6 and their description is omitted. Element 110 is a terminal to which is applied the reproduced signal from the switch 25 of FIG. 6. Element 111 is a terminal to which is applied a signal of a prescribed frequency (in this instance, f2). Element 112 is a terminal to which is applied a signal for controlling a switch 39. Element 113 is a sample and hold circuit. Element 114 is a terminal to which is applied a sampling pulse.

According to the construction of the tracking control system of FIG. 8, even when a pair of heads having different azimuths are used, for example, the heads 21a and 21b of FIG. 4 are used, only one signal of the prescribed frequency (f2) supplied to the multiplier 27 suffices for obtaining a tracking control signal.

That is, when the signal f2 is always used as the multiplier signal by the multiplier 27, only for the pilot signal f2 or f3 superimposed on the principal track from which the reproduced information signal is being produced, an effective tracking control signal is obtained. On this account, the output signal of a comparator 37 during this period is sampled and held whereby the effective tracking control signal is obtained. That is, the terminal 114 is supplied with the sample and hold pulse during the reproduction of the track on which the signal f2 or f3 was recorded in the superimposing relation, while the terminal 112 is supplied with such a signal that it rises before the sample and hold pulse in use for reproducing the track having the signal f2 and it falls before the sample and hold pulse in use for reproducing the track containing the signal f3. For example, in the normal reproduction mode, one sampling pulse for every two fields is supplied to the terminal 114, and a signal of rectangular wave with a four field period is applied to the terminal 112.

Even in such construction, for a desired reproduction speed, there is need only to produce one signal of a prescribed frequency for the purpose of obtaining the tracking control signal. Therefore, the circuit construction is extremely simplified. Moreover, in this construction there is no limit in the construction of the heads at all.

Though the foregoing description has been made using a signal of the same frequency as that of the pilot signal f2 (or the pilot signal itself) as the only one multiplier signal of the prescribed frequency, it is of course possible to use another signal of different frequency. In that case, only the values of the BPFs 33, 34 and 48 change.

Also, when the tape is transported at a speed multiplied by integer values in the normal reproduction mode, or in the so-called high speed search reproduction mode, particularly for the (4n+2) multiplied tape running speed, it is only required that the switch 39 operate in synchronism with 30 PG. Also, for the 4n multiplied tape running speed, there is no need to operate the switch 39.

As has been described in connection with the embodiments of the invention applied to the VTR, according to the invention, an information signal reproducing apparatus of very simplified construction is realized while still controlling tracking regardless of the order in which the tracks are reproduced.

What I claim:

1. An information signal reproducing apparatus, for reproducing information signals from a recording medium having formed thereon a plurality of tracks having successively recorded thereon four pilot signals with frequencies different from one another along with information signals, comprising:
   (a) reproducing means for tracing said plurality of recorded tracks for reproducing the information signals;
   (b) moving means for moving the recording medium in a direction intersecting said plurality of recorded tracks;
   (c) change-over means for switching said apparatus between a first reproducing mode and a second reproduction mode wherein:
   in said first reproduction mode said moving means moves said recording medium at a first speed with which said number of tracks are formed; and
   in said second mode said moving means moves the recording medium at a speed different from said first speed;
   (d) generation means for selectively generating four reference signals having different frequencies;
   (e) selection control means for controlling said generation means so as always to generate a single reference signal in said second mode and to periodically and sequentially generate four reference signals in said first mode;
   (f) signal processing means for forming a tracking control signal for said reproducing means by using said signal of the reference signals obtained from said generation means and the pilot signals reproduced by said reproducing means; and
   (g) tracking control means for controlling the tracking of said reproducing means based on said tracking control signal.

2. An apparatus according to claim 1, wherein said first speed is lower than said second speed.

3. An apparatus according to claim 1, wherein said second speed is lower than said first speed.

4. An apparatus according to claim 1, wherein said reproducing means includes first head means used only in the first mode and a second head means used only in said second mode.

5. An apparatus according to claim 4, wherein said first head means includes a pair of rotary heads having different azimuth angles.

6. An apparatus according to claim 4, wherein said first head means includes a rotary head with a fixed rotation plane, and said second head means includes a rotary head shiftable in a direction crossing its rotation plane.

7. An apparatus according to claim 1, wherein said signal processing means includes a determination circuit for determining the polarity of the tracking error signal.

8. An apparatus according to claim 7, further comprising polarity control means for controlling said determination circuit;
   said polarity control means being arranged for periodically inverting the polarity of said tracking error signal when the apparatus is in the first mode, and determining the timing for inverting the polarity using a pilot signal reproduced by the reproducing means.

9. An apparatus according to claim 8, wherein said plurality of tracks each includes a first area and second area recorded with different pilot signals, and said signal processing means uses pilot signals reproduced from the first area and said polarity control means uses pilot signals reproduced from the second area.

10. An information signal reproducing apparatus, for reproducing information signals from a recording medium having formed thereon a number of tracks on which four pilot signals having frequencies different from one another are recorded and on which information signals are recorded, comprising:
    (a) reproducing means for tracing said plurality of recorded tracks for reproducing the information signals;
    (b) signal processing means for forming a tracking control signal for said reproducing means by using said pilot signals reproduced at a first timing by said reproducing means;
    (c) process control means for controlling processing characteristics of said signal processing means by using pilot signals reproduced by a second timing different from the first timing; and
    (d) tracking control means for controlling the tracking of said reproducing means based on said tracking control signal.

11. An apparatus according to claim 10, wherein said plurality of tracks each includes a first area and second area, said signal processing means using pilot signals reproduced from said first area and said control means using pilot signals reproduced from said second area.

12. An apparatus according to claim 11, wherein said first and second areas of each of said plurality of tracks are recorded with different pilot signals.

13. An apparatus according to claim 10, wherein said signal processing means includes generation means for selectively generating four reference signals having different frequencies, and said process control means being arranged to control processing characteristics of said signal processing means using said reference signal.

14. An apparatus according to claim 13, wherein said process control means includes a multiplying circuit for multiplying the pilot signals reproduced by said reproducing means with said reference signals generated by said generation means and includes a detection circuit for detecting a predetermined frequency component in the signal multiplied by the multiplied circuit.

15. An apparatus according to claim 14, wherein said detecting circuit detects a frequency component corresponding to a difference between two pilot signals in said four pilot signals.

16. An apparatus according to claim 10, wherein said signal processing means includes a determination circuit for determining the polarity of said tracking error signal and said process control means controls said determination circuit.

17. An apparatus according to claim 15, further comprising:
    moving means for moving the recording medium in a direction intersecting said plurality of recorded tracks, and changeover means for switching said apparatus between a first reproducing mode and a second reproduction mode wherein:
    in said first reproduction mode said moving means moves said recording medium at a first speed with which said number of tracks are formed; and
    in said second mode said moving means moves the recording medium at a speed different from said first speed.

18. An apparatus according to claim 17, wherein said process control means is arranged to change over said processing characteristics of said signal processing means between when said apparatus is in said first mode and when it is in said second mode.

* * * * *